United States Patent [19]

Esau

[11] Patent Number: 4,747,062
[45] Date of Patent: May 24, 1988

[54] METHOD AND APPARATUS FOR DETECTING THE LEVEL OF A LIQUID IN A TANK

[75] Inventor: Norman D. Esau, Naperville, Ill.
[73] Assignee: Amoco Corporation, Chicago, Ill.
[21] Appl. No.: 686,097
[22] Filed: Dec. 24, 1984
[51] Int. Cl.⁴ .................. G01F 23/14; G01L 13/00
[52] U.S. Cl. .................... 364/509; 73/299; 73/861.49; 364/558
[58] Field of Search ............... 364/509, 558; 73/299, 73/301, 302, 861.46, 861.49

[56] References Cited
U.S. PATENT DOCUMENTS

| | | |
|---|---|---|
| 4,043,193 | 8/1977 | Bailey ..................... 73/302 |
| 4,389,888 | 6/1983 | Morooka .................. 73/299 |
| 4,393,705 | 4/1983 | Eidschun ................. 73/299 |
| 4,446,730 | 5/1984 | Smith ..................... 73/301 |

Primary Examiner—Parshotam S. Lall
Assistant Examiner—Daniel W. Juffernbruch
Attorney, Agent, or Firm—Ekkehard Schoettle; William H. Magidson; Ralph C. Medhurst

[57] ABSTRACT

The present invention provides for a process and apparatus for detecting the level of a liquid in a vessel. The method involves sensing the pressure head of the liquid level in column disposed with the vessel wherein the column liquid level has been adjusted to a first predetermined level. The level in the column is then adjusted to a second predetermined level. The pressure head of the second predetermined level in the column then sensed. The pressure of the liquid head in the vessel outside the column is sensed. The three pressure values are then used to determine the liquid level in the vessel.

16 Claims, 1 Drawing Sheet

U.S. Patent
May 24, 1988
4,747,062
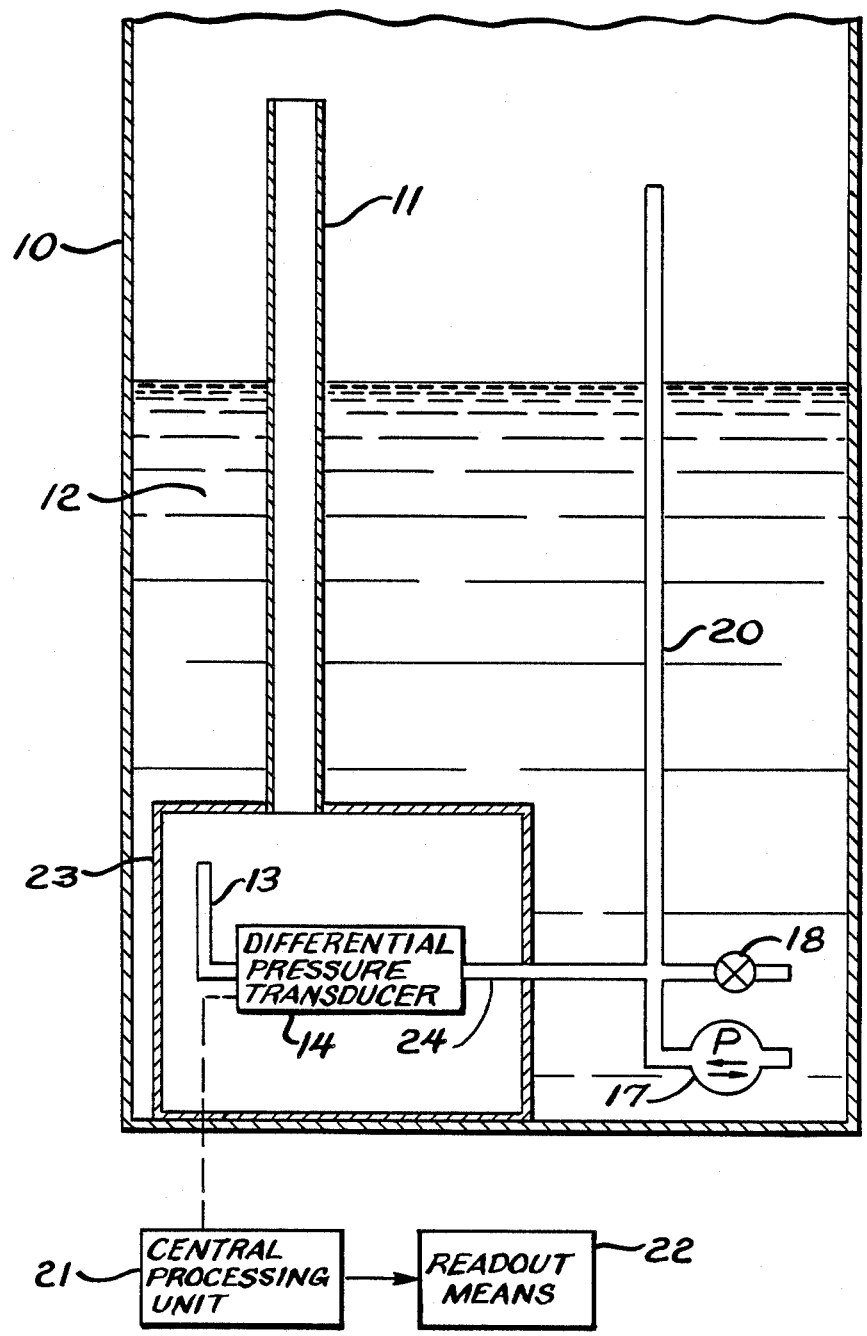

METHOD AND APPARATUS FOR DETECTING THE LEVEL OF A LIQUID IN A TANK

BACKGROUND OF THE INVENTION

The present invention relates to an apparatus and method for detecting the level of a liquid in a vessel.

In a specific aspect the present invention relates to an apparatus and method for detecting the level of a liquid in storage tanks, which may or may not be superatmospherically or subatmospherically pressurized.

Numerous methods have been used to determine liquid levels in storage vessels. However, these methods have the drawback that they only provide rough measurements which are often unacceptable.

One gauging method presently employed in certain liquid storage tanks, such as gasoline station storage tanks, is referred to as the bubbler system. In this system compressed gas, typically air, is introduced in very small quantities into a tube which runs from a metering area to the gasoline tank where the tube is extended vertically through the tank to within an inch of the bottom of the tank. The air bubbles out of the bottom of the tube, displacing the gasoline and the resultant pressure in the tube is proportional to the depth of the fluid in the tank. This pressure is sensed by a pressure gauge which provides a readout indicating the depth of gasoline. The bubbler system, however, is inadequate in that it does not compensate for changes in liquid density and liquid temperature which in turn affects the liquid vapor pressure thereby affecting the liquid level readout. Further this system presents obstacles in pressurized or sealed tanks when the bubbler gas has to vented due to pressure buildups and the bubbler gas is commingled with vapours such as hydrocarbons. Also, any long-term electronic drift associated with electronic pressure sensors is not accounted for in the subject method. Additionally, the bubbling of a gas through the hydrocarbon or other liquids may be deleterious to its quality, i.e., the degradation caused by oxidation of certain hydrocarbon constituents by contact with air.

Along the same vein, U.S. Pat. No. 4,199,983 (Kobayashi et al.) discloses an apparatus for detecting the level of fuel oil in a vessel. The subject apparatus comprises a sensing pipe having a sensing hole in its lower portion which pipe is continuously supplied with a gas. The pressure in the sensing pipe continuously increases as the level of fuel oil is raised above the level of the sensing hole. A fluid pressure-responsive device is connected to the sensing pipe. The pressure in the sensing pipe is indicative of the level in the tank. The subject device also does not compensate for changes in temperature which in turn affects the fuel oil density.

With the advent of self-service gasoline stations, there has been a decline in full-time attendants employed specifically to sell gasoline and automotive products. Thus, modern gasoline stations are increasingly operated by only a cashier who also dispenses food. The old practice of lowering a calibrated pole into the storage tank to determine liquid level is prohibited by laws which preclude personnel who dispense food from handling fuel in any way.

In the case where a liquid storage tank is pressurized, the tank must first be depressurized prior to insertion of a calibrated pole. Unfortunately, such a technique is tedious and inefficient when a large number of tanks are involved. Also, such a technique is not amenable to automatic telemetering of vessel inventories.

Further, environmental concerns have engendered the need for a method and apparatus for precisely detecting liquid levels in underground tanks where leakage into the surrounding groundwater is a possibility. A precise liquid level measurement technique would allow one to ascertain the existence of an underground tank leak, facilitating compliance with environmental regulations.

Measuring a liquid level in a closed pressure vessel accurately also presents specific problems. For instance, capacitance systems wherein the level in a pressurized tank is determined as a function of the capacitance measured by a probe in the tank are unavoidably inaccurate when debris or other non-liquid foreign matter adheres to the capacitance probe. Further, the oscillator associated with the capacitance probe is subject to drift.

Also, these capacitance devices must be calibrated for specific fluid dielectric constants and are generally unstable in gasoline-alcohol-water mixtures.

A liquid level measuring device should advantageously be adaptable to remote telemetering whereby vessel inventories can be precisely monitored and capacities judiciously managed. The term telemetering as used herein refers to the transmission of the measurement, i.e., liquid level to any point remote from the primary detector by any means, e.g. electrically, telephonically, radio waves.

Further, float and mechanical devices suffer from mechanical friction and sticking problems. Pneumatic devices must be calibrated for the specific gravity of the fluid being measured and are not easily adjusted to compensate for temperature variations in the liquid being measured.

Accordingly, it is an object of the present invention to provide a method and apparatus for accurately measuring the liquid level in a vessel at any pressure, whereby any changes in liquid density due to temperature or composition changes are compensated for and the longterm drift effect associated with an electronic pressure sensor means is also compensated for.

Further, it is an object of the present invention to provide a method and apparatus for measuring liquid levels whereby the measurement is amenable to remote telemetering.

These and other apparent objects and advantages are obtained by the present invention described in more detail in the following specification and accompanying drawing.

SUMMARY OF THE INVENTION

In a broad embodiment, the present invention provides a method for determining the level of a liquid in a vessel comprising the steps of: adjusting the liquid level of a generally upright column means with a liquid to a first predetermined level, the liquid in the column being the same as the liquid in the vessel, the column means being disposed within the vessel, and extending from a position near the bottom of the vessel to a position in an upper portion of the vessel; adjusting the liquid level of the column means to a second predetermined level with the liquid; sensing a first pressure head of the column means near the bottom of the column means after the liquid level has been adjusted to the first predetermined level; sensing a second pressure head of the column means near the bottom of the column means after the column means' liquid level has been adjusted to the second predetermined level; sensing the pressure head of the liquid within the vessel outside the column near the bottom of the vessel; and determining the level of the liquid in the vessel in accordance with the following formula:

$$L_3 = L_1 - \frac{(P_1 - P_3)}{(P_1 - P_2)} (L_1 - L_2)$$

where $L_3$ is the level of the liquid in the vessel; $L_1$ is the first predetermined level; $L_2$ is the second predetermined level; $P_1$ is the first pressure head of the first predetermined level; $P_2$ is the second pressure head of the second predetermined level; and $P_3$ is the pressure head of the level of the liquid in the vessel.

In another embodiment, the present invention provides for an apparatus for measuring the level of liquid in a vessel comprising: at least one generally upright column disposed within and fixedly secured to the vessel, the column having a top portion open to the interior of the vessel above the liquid level and a bottom portion extending to about the bottom of the vessel; a pump means for adjusting the level of the liquid in the column with liquid from the vessel to a predetermined level, the pump means being in communication with the bottom portion of the column; and a monitoring means in communication with the interior of the vessel and the column for determining the liquid level in the vessel.

BRIEF DESCRIPTION OF THE DRAWING

The drawing is a simplified schematic representation of the present invention partially depicted in block diagram form.

DETAILED DESCRIPTION OF THE INVENTION

The present invention is particularly useful when employed with liquids that possess a temperature-dependent density within a relatively narrow temperature range, e.g., ambient temperatures, and a composition-dependent density. Hydrocarbons, in particular, possess temperature- and composition-dependent properties. The present invention is most useful in connection with liquids such as gasolines, fuel oils, and various other hydrocarbon fractions stored in vessels such as underground tanks and aboveground pressurized vessels. The present invention is, however, not limited to use in connection with hydrocarbons but can be employed to inexpensively and accurately determine the liquid level of any liquid in a vessel.

The method and apparatus can best be understood by reference to the drawing.

The drawing depicts a liquid 12-containing vessel 10 with the apparatus of the invention deposed therein.

In the embodiment depicted in the drawing, a pressure-sensing means is enclosed in sealed submerged chamber 23 and comprises differential pressure-responsive transducer 14.

Submerged chamber 23 is in communication with vent 11 vented to the gaseous phase above the liquid level, i.e., the atmosphere above an open tank or pressurized gas above a pressurized tank.

The pressure-sensing means can be a pressure transducer of a differential pressure transducer. The pressure-sensing means can also comprise separate pressure-responsive transducers, namely a column-liquid head pressure transducer, and a vessel-liquid head pressure transducer. The cost of these commerically available transducers has decreased dramatically in recent years thereby reducing the cost of the apparatus of the present invention in comparison to other liquid level detection devices.

A separate column-liquid head pressure transducer (not shown in the figure) is in communication with and can be used for measuring the pressure of the liquid head in column 20 after the liquid level in the column has been adjusted to a predetermined level with liquid from vessel 10 by pump means 17. A vessel-liquid head pressure transducer (not shown in the figure) is in communication with and can be used to measure the liquid head in the vessel at about the bottom of the vessel. The column-liquid head pressure transducer can also be used to measure the pressure of the gas phase above the liquid level in the vessel when pump means 17 has been used to remove all of the liquid in column 20. Optionally, a separate pressure transducer can be employed to measure the pressure of the gas phase above the liquid in the vessel.

It is, however, preferred to utilize a single pressure-responsive device, i.e., a single absolute pressure transducer or differential pressure transducer as the use of a single transducer eliminates the effect of disparate electronic drifts associated with several separate pressure transducers upon the accuracy of the liquid level reading. While several identical pressure-responsive devices may, in theory, have identical electronic drifts, the possibility of a single-unit defect affecting the accuracy of a level reading is eliminated by the use of a single pressure-responsive device.

For brevity's sake, the invention is further described in accordance with the embodiment as depicted in the drawing where device 14 is a single differential pressure transducer. The low pressure port 13 of differential pressure transducer 14 is vented to the inside of chamber 23, while the high pressure port 24 is in communication with column 20 and vessel liquid 12 via valve 18.

Valve 18 vents high pressure port 24 to a level at about the bottom of vessel 10. When valve 18 is closed, pump means 17 can be used to adjust the liquid level of column 20 to any predetermined level including a level designated as empty, i.e., when all of the liquid in column 20 is removed. Thus, when valve 18 is closed, differential pressure transducer 14 can be used to measure the liquid-pressure head of any predetermined levels in column 20 including the pressure of the gas phase in the vessel above liquid 12 when all of the liquid in column 20 has been removed. When valve 18 is open, differential pressure transducer 14 can be used to measure the pressure of the liquid head in the vessel outside of column 20.

Column 20 is fixedly secured to the interior of the vessel and has a top portion open to the interior of the vessel extending above the liquid level in the vessel and a bottom portion extending to about the bottom of the vessel. The transverse cross-sectional area of the column is substantially less than the transverse cross-sectional area of the vessel. The transverse cross-sectional area of the column, however, should not be so small that capillary effects predominate with respect to the liquid in the column.

A liquid level reading in vessel 10 is measured in the following manner.

First, pump means 17 is used to adjust the liquid level in column 20 to a first predetermined level while valve 18 is closed. This first predetermined level $L_1$ can be any level. A convenient first predetermined level can be a level indicative of a liquid-full vessel 10.

Second, a differential pressure reading $P_1$ is taken by differential pressure transducer 14, the reading value $P_1$ being indicative of the level reading $L_1$. These values $L_1$ and $P_1$ are then entered into central processing unit 21.

Third, pump means 17 is used to adjust the level in column 20 to a second predetermined level $L_2$. $L_2$ can be any convenient level including one indicative of an empty vessel 10, e.g., when all of the liquid in column 20 is removed. Another differential pressure reading $P_2$ is taken, indicative of the second predetermined level in column 20. These values $L_2$ and $P_2$ are then entered into central processing unit 21.

It should be noted that a second column similar to column 10 can be disposed with vessel 10 with attendant valve and pump means whereby the value $P_2$ can be measured in response to the liquid head of the second predetermined level $L_2$ in the second column.

Fourth, valve 18 is opened whereby a differential pressure reading is taken, indicative of the level in the vessel. This value, designated as $P_3$, is similarly entered into central processing unit 21.

Central processing unit 21 then serves to calculate a value $L_3$ indicative of the actual liquid level in the vessel in accordance with following formula:

$$L_3 = L_1 - \frac{(P_1 - P_3)}{(P_1 - P_2)} (L_1 - L_2)$$

The value $L_3$ is then transferred to readout means 22 which may be local or remote.

In the drawing, differential pressure transducer 14, central processing unit 21 and readout means 22 comprise a monitoring means for determining a value indicative of the level in the vessel.

The method and apparatus of the invention obviate the difficulties associated with conventional liquid level measurement methods. Conventional methods require accurate measurement of several liquid variables such as liquid temperature and composition, followed by mathematical compensation therefor to determine the density of the liquid.

Further, the method of the invention automatically compensates for any drift in the pressure-responsive device, thereby avoiding close control of the calibration of the pressure-responsive device. Where several identical pressure-responsive devices are used, one can assume equivalent electronic drift characteristics absent a unit defect. The method of the invention automatically compensates for not only for electronic drift, but also liquid property changes each time a measurement is made in accordance with the above-described procedure. It should also be noted that the apparatus of the invention can be readily retrofitted into existing vessels by installation via the vessel access openings.

Although embodiments of the above process have been shown and described, it is to be understood that various modifications and substitutions, as well as rearrangements and combinations of process steps, can be made by those skilled in the art without departing from the novel spirit and scope of this invention.

What is claimed is:

1. A method for determining the level of a liquid in a vessel, comprising the steps of:
   (a) adjusting the liquid level of a generally upright column means with a liquid to a first predetermined level, the liquid in the column being the same as the liquid in the vessel, the column means being disposed within the vessel, and extending from a position near the bottom of the vessel to a position in an upper portion of the vessel;
   (b) adjusting the liquid level of the column means to a second predetermined level with the liquid;
   (c) sensing a first pressure head of the column means near the bottom of the column means after the column means liquid level has been adjusted to the first predetermined level;
   (d) sensing a second pressure head of the column means near the bottom of the column means after the column means liquid level has been adjusted to the second predetermined level;
   (e) sensing the pressure head of the liquid within the vessel outside the column near the bottom of the vessel; and
   (f) determining the level of the liquid in the vessel in accordance with the following formula:

$$L_3 = L_1 - \frac{(P_1 - P_3)}{(P_1 - P_2)} (L_1 - L_2)$$

where $L_3$ is the level of the liquid in the vessel; $L_1$ is the first predetermined level; $L_2$ is the second predetermined level; $P_1$ is the first pressure head of the first predetermined level; $P_2$ is the second pressure head of the second predetermined level; and $P_3$ is the pressure head of the level of the liquid in the vessel.

2. The method of claim 1 wherein the filling in step (a) is carried out in a first column and the filling in step (b) is carried out in a second column.

3. The method of claim 1 wherein the filling in steps (a) and (b) is carried out in the same column.

4. The method of claim 1 wherein the value $L_3$ is telemetered to a remote readout means.

5. The method of claim 1 wherein the first predetermined level corresponds to a liquid-full vessel and the second predetermined level corresponds to an empty vessel.

6. The method of claim 2 wherein the first predetermined level corresponds to a full vessel and the second predetermined level corresponds to an empty vessel.

7. An apparatus for measuring the level of liquid in a vessel comprising:
   (a) at least one generally upright column disposed within and fixedly secured to the vessel, the column having a top portion open to the interior of the vessel above the liquid level and a bottom portion extending to about the bottom of the vessel;
   (b) pump means for adjusting the level of the liquid in the column with liquid from the vessel to a predetermined level, the pump means being in communication with the bottom portion of the column; and
   (c) monitoring means in communication with the interior of the vessel and the column for determining the liquid level in the vessel.

8. The apparatus of claim 7 wherein the monitoring means comprises a unitary pressure-sensing means for sensing the pressure of the pressure head in the column, and the liquid pressure head in the vessel outside of the column.

9. The apparatus of claim 8 wherein the unitary pressure-sensing means comprises a differential pressure-responsive device having means in communication with a gaseous phase above the liquid level in the vessel, the liquid at about the bottom of the vessel, and the bottom portion of the column.

10. The apparatus of claim 7 wherein the monitoring means comprises a column head pressure-sensing means for sensing the pressure of the head in the column, and a vessel liquid head pressure-sensing means for sensing the pressure of the liquid head in the vessel outside the column.

11. The apparatus of claim 10 wherein each of the pressure-sensing means comprises a differential pressure responsive device having means in communication with a gaseous phase above the liquid level in the vessel.

12. The apparatus of claim 7 wherein the monitoring means further comprises a central processing unit.

13. The apparatus of claim 12 wherein the monitoring means further comprises a remote readout means in communication with the central processing unit for displaying a value indicative of the liquid level in the vessel.

14. The apparatus of claim 7 wherein the vessel is selected from the group consisting of underground tanks and aboveground tanks.

15. The apparatus of claim 7 wherein the vessel has two generally upright columns disposed therein.

16. The apparatus of claim 7 wherein the transverse cross-sectional area of the column is substantially less than the transverse cross-sectional area of the vessel.

* * * * *